United States Patent Office 3,335,165
Patented Aug. 8, 1967

3,335,165
PREPARATION OF ALKYL 2-MERCAPTO-
ETHYLCARBONATES
Dee Lynn Johnson and Delbert Daniel Reynolds, Rochester, N.Y., assignors to Eastman Kodak Company, Rochester, N.Y., a corporation of New Jersey
No Drawing. Filed Aug. 7, 1964, Ser. No. 388,295
17 Claims. (Cl. 260—463)

This invention concerns a new and improved process for the production of alkyl 2-mercaptoethylcarbonates. This application is a continuation-in-part of our abandoned copending application Ser. No. 80,970, filed Jan. 6, 1961.

The alkyl 2-mercaptoethylcarbonates prepared by the process of our invention are useful in manufacturing ethylene sulfide which is an important organic intermediate. It polymerizes readily to yield polyethylene sulfide which in turn can be converted to derived polymers. In addition, ethylene sulfide is a useful material for destroying vermin and other noxious organisms when used to prepare insecticides, fungicides and the like. The use of this material in this manner is described in U.S. Patents 2,094,914, 2,102,564 and 2,225,573. In addition it has been used in numerous synthesis as described in the "Journal of the American Chemical Society," vol. 70, page 217 (1948).

Due to the structure of ethylene sulfide

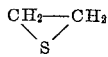

it is highly reactive and, in fact, reacts with itself to polymerize easily. Accordingly, when ethylene sulfide is prepared by methods known in the prior art, it has been known to polymerize during the course of preparation. For instance, ethylene sulfide may be prepared as follows:

ClCH$_2$CH$_2$SH + NaHCO$_3$ ⟶

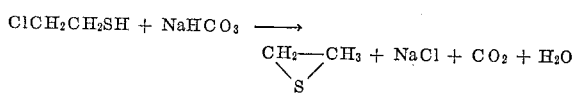

When ethylene sulfide is prepared according to this method, it must be separated by fractionation to free it from water. This is difficult to do because of the ease with which it polymerizes. In addition, 2-chloroethylmercaptan is not readily available.

Other methods of preparing ethylene sulfide are known, but some of these either produce small yields or involve difficulties in producing ethylene sulfide without polymerization.

It has been discovered that ethylene sulfide can be obtained in good yields by decomposition of alkyl 2-mercaptoethylcarbonates. The reaction is as follows:

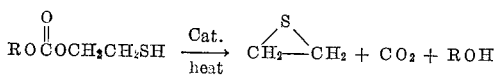

where R is an alkyl group containing 1 to 8 carbon atoms. This composition may also be used to react with other compositions to form useful and valuable compounds.

An object of this invention is to provide a process for the preparation of alkyl 2-mercaptoethylcarbonates.

In preparing starting mateirals for use in the process of our invention, we react an alkyl chloroformate with 2-mercaptoethanol in the presence of alkali metal base such as sodium hydroxide, potassium hydroxide, or lithium hydroxide. The reaction is preferably carried out at a pH of about 6 to 8, but may be varied. A two-phase solvent system is used employing water and an immiscible inactive solvent such as benzene, ethyl ether, petroleum ether and the like.

The reaction may be run continuously by reacting an aqueous solution of sodium 2-hydroxyethylmercaptide with a benzene solution of ethyl chloroformate by introducing the reactants simultaneously through a series of mixing reactors followed by distillation of the final product. The following equation indicates the reaction:

HOCH$_2$CH$_2$SNa + ClCOOC$_2$H$_5$
⟶ HOCH$_2$CH$_2$SCOOC$_2$H$_5$ + NaCl

Potassium hydroxide or lithium hydroxide may be substituted for sodium hydroxide in the reaction. Other alkyl chloroformates may be used employing alkyl groups of 1–8 carbon atoms.

The process of our invention involves the isomerization of an alkyl-2-hydroxyethylthiolcarbonate. The isomer is formed by the migration of a carbalkoxy group from a sulfur to an oxygen atom. This involves the use of a catalyst. The process of our invention can be represented by the following equation:

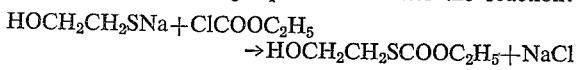

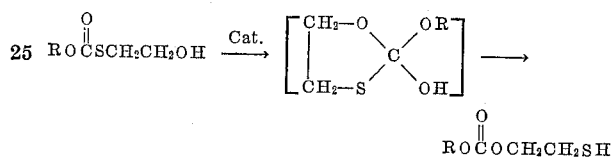

The catalyst must be carefully chosen lest a reaction set in with the formation of ethylene sulfide and its polymer. We have found that the isomerization may be effected by the alkaline earth metal and rare earth element salts of organic acids. Examples of organic acids whose salts are useful include lower alkanoic acids such as formic acid, acetic acid, propionic acid, butyric acid and isobutyric acid; lower alkanedioic acids such as oxalic acid, malonic acid, succinic acid, glutaric acid and adipic acid and aromatic monocarboxylic and aromatic dicraboxylic acids such as benzoic acid, naphthoic acid, phthalic acid, isophthalic acid and terephthalic acid. Although it is not possible to list each and every one of the alkaline earth salts of organic acids, all of those effect this isomerization and have a significantly small effect in causing liberation of ethylene sulfide and its subsequent polymerization.

Certain of the salts of the rare earth elements are more effective than others. This is shown below in Tables I, II and III.

The following examples illustrate our invention or the preparation of starting materials useful in our invention.

EXAMPLE 1

*Preparation of ethyl 2-hydroxyethylthiolcarbonate*

A mixture of 1 l. of benzene, 542 g. (5 moles) of ethyl chloroformate and 200 ml. of water was stirred at 15° C. A solution consisting of 1.5 l. of water, 200 g. (5 moles) of sodium hydroxide and 390 g. (5 moles) of 2-mercaptoethanol was added over a period of one hour. During this time, the reaction temperature was maintained between 15° and 20° C. After stirring for an additional 15 minutes, the reaction mixture was acidified with hydrochloric acid. The benzene layer was separated, washed once with 500 ml. of cold water, separated and dried over anhydrous MgSO$_4$. Twenty-five grams of stearic acid was added and the benzene removed under vacuum. The product was then distilled through an 18″ glass-helices-packed column equipped with a variable reflux ratio stillhead. B.P. 84°/ 0.4 mm.; $n_D^{25}$ 1.4782. Yield 653 g. (87 percent).

EXAMPLE 2

The following procedure is for a seven-hour run of a continuous reactor producing ethyl 2-hydroxyethylthiolcarbonate.

Three liters of ice and water were stirred while 800 g. (20 moles) of sodium hydroxide pellets were added in portions. To this cooled solution were added 1562 g. (20 moles) of 2-mercaptoethanol in portions. The resulting solution was diluted with water to a total of 5.7 liters. This solution was transferred to a reservoir A. Two thousand one hundred and sixty g. (20 moles) of ethylchloroformate were diluted with stirring to 5.7 l. with benzene, then transferred to a reservoir B. This procedure was repeated through the course of the reaction to maintain the level of the solutions in the reservoirs.

With the pumps adjusted to deliver the reactants at the rate of 19 moles per hour and the reaction flasks connected in series half-filled with water, the reactor was turned on. A pH 6 to Universal Indicator paper was maintained. The stabilized temperatures in the reaction flasks in order from the reservoirs were: $E=54°$; $F=34°$; $G=21°$; and $H=19°$.

Each 3 l. of benzene-product solution from the receiver was washed with 500 ml. water and 3 ml. concentrated hydrochloric acid. Stearic acid (20 g. 3 l. of solution) was added to insure acid conditions during distillation. Benzene and residual water were removed azeotropically under reduced pressure. Product isolation was effected through a 14-inch glass-helices-packed column.

Seven hours operation of the reactor produced 18,249 g. or 91.6% yield of ethyl 2-hydroxyethylthiolcarbonate (I), B.P. 110°, $n_D^{25}$ 1.4782±0.0001.

*Analysis.*—Calcd. for $C_5H_{10}O_3S$: C, 40.0; H, 6.7; S, 21.3. Found: C, 40.3; H, 6.7; S, 21.1.

EXAMPLE 3

*Preparation of ethyl 2-mercaptoethylcarbonate by isomerization of ethyl 2-hydroxyethylthiolcarbonate in the presence of uranyl acetate*

Five moles (750 g.) of ethyl 2-hydroxyethylthiolcarbonate ($n_D^{25}$ 1.4783) were placed in a 1-l. flask equipped with an 18″ column packed with glass helices and attached to a variable reflux-rate stillhead. The catalyst, as listed in the tables, was added to the flask and the system evacuated with a water pump. The flask was heated until distillation began and the distillation was continued until the temperature began to rise above 84° C./9 mm. Table I lists the results of a catalyst concentration series.

EXAMPLE 4

*Re-use of uranyl acetate catalyst*

Ten moles (1500 g.) of ethyl 2-hydroxyethylthiolcarbonate and 0.025 g. of uranyl acetate were treated as described in the general procedure above. The ethyl 2-mercaptoethylcarbonate was separated by distillation and then without addition of more catalyst, a second ten moles of ethyl 2-hydroxyethylthiolcarbonate was isomerized. After this a third ten mole batch was run. This shows that the catalyst may be re-used. The results are shown in Table II.

TABLE II.—Re-Use of Uranyl Acetate Catalyst

| Run No. | $C_2H_5OCOSCH_2CH_2OH$, moles | $C_2H_5OCO_2CH_2CH_2SH$, Percent yield | $n_D^{25}$ * |
|---|---|---|---|
| 1 | 10 | 83.0 | 1.4527 |
| 2 | 10 | 94.0 | 1.4528 |
| 3 | 10 | 97.5 | 1.4521 |

* $n_D^{25}$ for pure product 1.4522.

EXAMPLE 5

*Cerium salts as catalysts for isomerization of ethyl 2-hydroxyethylthiolcarbonate*

The procedure was as described for uranyl acetate. The results are shown in Table III. In each case 1 mole of ethyl 2-hydroxyethylthiolcarbonate was used.

TABLE III

| Salt | Catalyst (grams) | $C_2H_5OCO_2CH_2CH_2SH$, percent yield | $n_D^{25}$ |
|---|---|---|---|
| $Ce(C_2H_3O_2)_3$ | 1.49 | 67 | 1.4528 |
| | 0.75 | 86 | 1.4522 |
| | 0.37 | 92 | 1.4721 |
| | 0.18 | 88 | 1.4532 |
| $Ce(C_2H_3O_2)_4$ | *0.51 | 90 | 1.4528 |

*This same catalyst sample was re-used for six subsequent one-mole runs with yields between 94 and 98 percent and $n_D^{25}$ values from 1.4521 to 1.4528.

$5\times10^{-3}$ to $5\times10^{-4}$ mole $Ce(C_2H_3O_2)_3$ per mole ethyl 2-hydroxyethylthiolcarbonate may be used, but $2.5\times10^{-3}$ to $5\times10^{-4}$ mole is the preferred range. The same proportions of $Ce(C_2H_3O_2)_4$ may be used.

EXAMPLE 6

*Alkaline earth metal salts as catalysts*

This class of catalyst is illustrated by the use of calcium acetate and magnesium acetate. The general procedure is as described above. The amounts of ethyl 2-hydroxyethylthiolcarbonate and catalyst used are shown in Table IV. Percentage yields of ethyl 2-mercaptoethylcarbonate with refractive indices are tabulated.

TABLE IV.—ISOMERIZATION OF ETHYL 2-HYDROXYETHYLTHIOLCARBONATE BY ALKALINE EARTH SALTS

| Salt (catalyst) | Wt. grams (catalyst) | $C_2H_5OCOSCH_2CH_2OH$, moles | $C_2H_5OCO_2CH_2CH_2SH$, percent yield | $n_D^{25}$ |
|---|---|---|---|---|
| $Mg(C_2H_3O_2)_2$ | 0.02 | 1 | 58 | 1.4522 |
| $Mg(C_2H_3O_2)_2$ | 0.01 | 1 | 58 | 1.4528 |
| $Mg(C_2H_3O_2)_2$ | 0.02 | 4 | 63 | 1.4528 |
| $Ca(C_2H_3O_2)_2$ | 0.017 | 1 | 51 | 1.4520 |
| $Ca(C_2H_3O_2)_2$ | 0.017 | 4 | 64 | 1.4523 |
| $Ca(C_2H_3O_2)_2$ | 0.021 | 5 | 64 | 1.4526 |
| $Ca(C_2H_3O_2)_2$ | 0.045 | 10 | 66 | 1.4539 |

TABLE I

| Wt. of uranyl acetate (g.) | Wt. of ethyl 2-mercaptoethylcarbonate obtained (g.) | Percent yield | B.P. at 9 mm. | $n_D^{25}$ * |
|---|---|---|---|---|
| 0.20 | 465 | 61 | 84 | 1.4534 |
| 0.10 | 560 | 74 | 84 | 1.4525 |
| 0.05 | 611 | 81 | 84 | 1.4522 |
| 0.025 | 666 | 88 | 84 | 1.4531 |
| 0.012 | 725 | 97 | 84 | 1.4532 |
| 0.000 | 000 | 00 | | |

* Pure product has $n_D^{25}=1.4522$. $1\times10^{-4}$ to $5\times10^{-6}$ mole $UO_2(CH_3COO)_2\cdot2H_2O$ per mole ethyl 2-hydroxyethylcarbonate may be used, but a range of $2\times10^{-5}$ to $5\times10^{-6}$ mole is preferred.

$1\times10^{-3}$ to $5\times10^{-5}$ mole $Mg(C_2H_3O_2)_2$ per mole ethyl 2-hydroxyethylthiolcarbonate may be used, but a range of $1\times10^{-4}$ to $3\times10^{-5}$ is preferred. $1\times10^{-4}$ to $5\times10^{-6}$ mole $Ca(C_2H_3O_2)_2$ per mole ethyl 2-hydroxyethylthiolcarbonate may be used, but a range of $2\times10^{-5}$ to $3\times10^{-6}$ is preferred.

EXAMPLE 7

*Preparation of ethyl 2-mercaptoethylcarbonate by reaction of ethyl chloroformate with 2-mercaptoethanol under acidic conditions*

Two moles of 2-mercaptoethanol plus 4 moles of ethyl chloroformate were heated on a steam bath under a reflux condenser for seven hours. Crude ethyl 2-mercaptoethylcarbonate was collected by distillation, B.P. 74–80° C./7.0 mm.; $n_D^{25}=1.4568$; Yield 105 g. (35 percent).

*Analysis.*—Calcd. for $C_5H_{10}SO_3$: C, 40.0; H, 6.7; S, 21.3. Found: C, 40.2; H, 6.7; S, 21.3.

The close analyses and the high index of refraction indicate some isomeric ethyl 2-hydroxyethylthiolcarbonate as an impurity.

EXAMPLE 8

*Preparation of isobutyl 2-mercaptoethylcarbonate by isomerization of isobutyl 2-hydroxyethylthiolcarbonate in the presence of uranyl acetate*

Isobutyl 2-hydroxyethylthiolcarbonate (B.P. 81°/0.1 mm. $n_D^{25}$ 1.4714) was prepared in 85% yield from isobutylchloroformate and sodium 2-hydroxyethylmercaptide in the manner described in Example 1.

In a procedure corresponding to Example 3, 99 g. (0.5 mole) of isobutyl 2-hydroxyethylthiolcarbonate and 0.0065 g. of uranyl acetate gave 92 g. or 93% yield of isobutyl 2-mercaptoethylcarbonate (B.P. 60°/1.2 mm. $n_D^{25}$ 1.4513, 97.3% pure by iodimetric titration).

EXAMPLE 9

*Preparation of n-hexyl 2-mercaptoethylcarbonate by isomerization of n-hexyl 2-hydroxyethylthiolcarbonate in the presence of uranyl acetate* n-Hexyl 2-hydroxyethylthiocarbonate (B.P. 109/0.05 mm. $n_D^{25}$ 1.4718) was prepared in 77% yield from n-hexylchloroformate and sodium 2-hydroxyethylmercaptide in the manner described in Example 1.

In a procedure corresponding to Example 3, 103 g. (0.5 mole) of n-hexyl 2-hydroxyethylthiolcarbonate and 0.020 g. of uranyl acetate gave 85 g. or 82% yield of n-hexyl 2-mercaptoethylcarbonate (B.P. 91°/1.0 mm. $n_D^{25}$ 1.4542 87% pure by iodimetric titration).

Although it has been shown above that certain salts are our preferred embodiment and produce better results, all of the alkaline earth metal salts and the rare earth element salts of organic acids are operable, and within the scope of our invention.

The amounts of the catalysts vary depending upon the particular catalyst. However, one skilled in the catalyst art can readily determine the preferred amounts needed as shown in the example. Accordingly, the operative amounts are referred to herein as a catalytic amount.

Since the alkyl 2-mercaptoethylcarbonate begins to decompose at about 180° C., the reaction must be carried out at lower temperatures. Therefore, it will be apparent to one skilled in the art that the temperature and pressure can be adjusted to provide a temperature range at which distillation of the product from the reaction mixture can be obtained. A pot temperature of 75–150° C. can be used with the pressure adjusted to obtain distillation throughout the range. However, our preferred temperature range is 100–110° C.

The invention has been described in detail with particular reference to preferred embodiments thereof, but it will be understood that variations and modifications can be effected within the spirit and scope of the invention as described hereinabove and as defined in the appended claims.

We claim:

1. A process for preparing alkyl 2-mercaptoethylcarbonate which comprises heating, at a temperature below its decomposition temperature, an alkyl 2-hydroxyethylthiolcarbonate having an alkyl group of from 1 through 8 carbon atoms in the presence of a catalytic amount of a catalyst selected from the group consisting of (1) an alkaline earth metal salt of an organic acid selected from the group consisting of a lower alkanoic acid, a lower alkanedioic acid, an aromatic monocarboxylic acid and an aromatic dicarboxylic acid and (2) a rare earth element salt of an organic acid selected from the group consisting of a lower alkanoic acid, a lower alkanedioic acid, an aromatic monocarboxylic acid and an aromatic dicarboxylic acid.

2. A process for preparing alkyl 2-mercaptoethylcarbonate which comprises heating, at a temperature below its decomposition temperature, an alkyl 2-hydroxyethylthiolcarbonate having an alkyl group of from 1 through 8 carbon atoms in the presence of a catalytic amount of an alkaline earth metal salt of an organic acid selected from the group consisting of a lower alkanoic acid, a lower alkanedioic acid, an aromatic monocarboxylic acid and an aromatic dicarboxylic acid.

3. A process for preparing alkyl 2-mercaptoethylcarbonate which comprises heating, at a temperature below its decomposition temperature, an alkyl 2-hydroxyethylthiolcarbonate having an alkyl group of from 1 through 8 carbon atoms in the presence of a catalytic amount of an alkaline earth metal salt of acetic acid.

4. A process for preparing alkyl 2-mercaptoethylcarbonate which comprises heating, at a temperature below its decomposition temperature, an alkyl 2-hydroxyethylthiolcarbonate having an alkyl group of from 1 through 8 carbon atoms in the presence of a catalytic amount of a rare earth element salt of an organic acid selected from the group consisting of a lower alkanoic acid, a lower alkanedioic acid, an aromatic monocarboxylic acid and an aromatic dicarboxylic acid.

5. A process for preparing alkyl 2-mercaptoethylcarbonate which comprises heating, at a temperature below its decomposition temperature, an alkyl 2-hydroxyethylthiolcarbonate having an alkyl group of from 1 through 8 carbon atoms in the presence of a catalytic amount of a catalyst selected from the group consisting of alkaline earth metal salts of acetic acid and rare earth element salts of acetic acid.

6. A process for preparing alkyl 2-mercaptoethylcarbonate which comprises heating, at a temperature below its decomposition temperature, an alkyl 2-hydroxyethylthiolcarbonate having an alkyl group of from 1 through 8 carbon atoms in the presence of a catalytic amount of a rare earth element salt of acetic acid.

7. A process for the preparation of alkyl 2-mercaptoethylcarbonate which comprises boiling an alkyl 2-hydroxyethylthiolcarbonate having an alkyl group of from 1 through 8 carbon atoms at a temperature of from about 75° C. to 150° C. at below atmospheric pressure in the presence of a catalytic amount of a rare earth element salt of an organic acid selected from the group consisting of a lower alkanoic acid, a lower alkanedioic acid, an aromatic monocarboxylic acid and an aromatic dicarboxylic acid.

8. A process for the preparation of ethyl 2-mercaptoethylcarbonate which comprises heating, at a temperature below its decomposition temperature, ethyl 2-hydroxyethylthiolcarbonate in the presence of a catalytic amount of a catalyst selected from the group consisting of alkaline earth metal salts of acetic acid and rare earth element salts of acetic acid.

9. A process for the preparation of n-hexyl-2-mercaptoethylcarbonate which comprises heating, at a temperature below its decomposition temperature, n-hexyl-2-hydroxyethylthiolcarbonate in the presence of a catalytic amount of a catalyst selected from the group consisting of alkaline earth metal salts of acetic acid and rare earth element salts of acetic acid.

10. A process for the preparation of isobutyl 2-mercaptoethylcarbonate which comprises heating, at a temperature below its decomposition temperature, isobutyl 2-hydroxyethylthiolcarbonate in the presence of a catalytic amount of a catalyst selected from the group consisting of alkaline earth metal salts of acetic acid and rare earth element salts of acetic acid.

11. A process for the preparation of ethyl 2-mercaptoethylcarbonate which comprises boiling ethyl 2-hydroxyethylthiolcarbonate at a temperature of about 75° C. to 150° C. at below atmospheric pressure in the presence of a catalytic amount of a catalyst selected from the group consisting of alkaline earth metal salts of acetic acid and rare earth element salts of acetic acid, and distilling off ethyl 2-mercaptoethylcarbonate.

12. A process for the preparation of ethyl 2-mercaptoethylcarbonate which comprises heating, at a temperature below its decomposition temperature, and at below atmospheric pressure ethyl 2-hydroxyethylthiolcarbonate in the presence of a catalytic amount of uranyl acetate.

13. A process for the preparation of alkyl 2-mercaptoethylcarbonate which comprises heating, at a temperature below its decomposition temperature, an alkyl 2-hydroxyethylthiolcarbonate having an alkyl group of from 1 through 8 carbon atoms in the presence of a catalytic amount of uranyl acetate.

14. A process for the preparation of alkyl 2-mercaptoethylcarbonate which comprises heating, at a temperature below its decomposition temperature, an alkyl 2-hydroxyethylthiolcarbonate having an alkyl group of from 1 through 8 carbon atoms in the presence of a catalytic amount of $Ce(C_2H_3O_2)_3$.

15. A process for the preparation of alkyl-2-mercaptoethylcarbonate which comprises heating, at a temperature below its decomposition temperature, an alkyl 2-hydroxyethylthiolcarbonate having an alkyl group of from 1 through 8 carbon atoms in the presence of a catalytic amount of $Ce(C_2H_3O_2)_4$.

16. A process for the preparation of alkyl 2-mercaptoethylcarbonate which comprises heating, at a temperature below its decomposition temperature, an alkyl 2-hydroxyethylthiolcarbonate having an alkyl group of from 1 through 8 carbon atoms in the presence of a catalytic amount of $Mg(C_2H_3O_2)_2$.

17. A process for the preparation of alkyl 2-mercaptoethylcarbonate which comprises heating, at a temperature below its decomposition temperature, an alkyl 2-hydroxyethylthiolcarbonate having an alkyl group of from 1 through 8 carbon atoms in the presence of a catalytic amount of $Ca(C_2H_3O_2)_2$.

No references cited.

CHARLES B. PARKER, *Primary Examiner.*

BERNARD BILLIAN, *Assistant Examiner.*